US009192168B1

(12) United States Patent
Rodrigues

(10) Patent No.: US 9,192,168 B1
(45) Date of Patent: Nov. 24, 2015

(54) CRACKER FINISHING MACHINE

(71) Applicant: Mary's Gone Crackers, Gridley, CA (US)

(72) Inventor: Dale Rodrigues, Paradise, CA (US)

(73) Assignee: Mary's Gone Crackers, Inc., Gridley, CA (US)

( * ) Notice: Subject to any disclaimer, the term of this patent is extended or adjusted under 35 U.S.C. 154(b) by 9 days.

(21) Appl. No.: 13/706,238

(22) Filed: Dec. 5, 2012

Related U.S. Application Data

(60) Provisional application No. 61/567,432, filed on Dec. 6, 2011.

(51) Int. Cl.
*A21C 7/06* (2006.01)
*A21B 5/00* (2006.01)
*A21C 11/00* (2006.01)
*A21C 15/00* (2006.01)
*A21C 9/06* (2006.01)

(52) U.S. Cl.
CPC ................ *A21B 5/00* (2013.01); *A21C 11/006* (2013.01); *A21C 7/06* (2013.01); *A21C 9/06* (2013.01); *A21C 11/004* (2013.01); *A21C 15/002* (2013.01)

(58) Field of Classification Search
CPC .. A21C 11/006; A21C 15/002; A21C 11/004; A21C 9/06; A21C 7/06
USPC ........... 425/193, 195, 346, 394, 398, 406, 92, 425/96, 101, 100, 103, 364 R, 818
See application file for complete search history.

(56) References Cited

U.S. PATENT DOCUMENTS

| 1,862,380 | A | * | 6/1932 | Larson | 118/710 |
| 3,392,687 | A | * | 7/1968 | Lane | 425/195 |
| 4,634,365 | A | * | 1/1987 | Triporo et al. | 425/398 |
| 4,938,126 | A | * | 7/1990 | Rubio et al. | 99/349 |
| 4,973,240 | A | * | 11/1990 | Reilly | 425/195 |
| 5,006,358 | A | * | 4/1991 | Ribio et al. | 426/496 |
| 5,176,922 | A | * | 1/1993 | Balsano et al. | 425/89 |
| 6,112,647 | A | * | 9/2000 | Brunner et al. | 99/349 |
| 6,365,210 | B1 | * | 4/2002 | Schaible et al. | 426/94 |
| 6,629,493 | B1 | * | 10/2003 | Schaible et al. | 99/352 |
| 7,669,527 | B2 | * | 3/2010 | Schultz et al. | 100/326 |
| 8,689,685 | B2 | * | 4/2014 | Lawrence | 100/315 |
| 8,746,132 | B2 | * | 6/2014 | Lawrence et al. | 99/349 |
| 8,770,960 | B2 | * | 7/2014 | Mattias et al. | 425/193 |
| 8,846,124 | B2 | * | 9/2014 | Heinzen | 426/502 |
| 2004/0211323 | A1 | * | 10/2004 | Heinzen et al. | 99/349 |
| 2004/0258785 | A1 | * | 12/2004 | Schultz | 425/89 |
| 2005/0006208 | A1 | * | 1/2005 | Armstrong | 198/810.03 |
| 2005/0287240 | A1 | * | 12/2005 | Mattias et al. | 425/408 |
| 2007/0034092 | A1 | * | 2/2007 | Lawrence et al. | 99/349 |
| 2008/0073178 | A1 | * | 3/2008 | Lawrence | 198/357 |

(Continued)

*Primary Examiner* — Seyed Masoud Malekzadeh

(74) *Attorney, Agent, or Firm* — Marsh Fischmann & Breyfogle LLP

(57) ABSTRACT

Non-traditional dough, such as gluten-free, vegan dough, is processed to make high quality baked products in an industrial process. In the case of cracker production, a cracker finishing machine (100) is provided between a dough depositing machine and an oven to prepare the dough for baking. The dough is flattened to a substantially uniform thickness and moistened by the finishing machine (100). Baking trays (300) with deposited cracker dough are loaded onto a pedestal (120) and pressed against a platen (130) to provide the desired flattening. At the same time, a blotting belt (150) misted with cooking oil is interposed between the platen (130) and the dough for moisturizing.

10 Claims, 27 Drawing Sheets

Full view into the misting station 160 showing how a section of the continuous blotting belt 150 is sprayed with cooking oil

(56) References Cited

U.S. PATENT DOCUMENTS

| | | | |
|---|---|---|---|
| 2008/0102152 A1* | 5/2008 | Mattias et al. | 425/408 |
| 2008/0141874 A1* | 6/2008 | Schultz et al. | 100/334 |
| 2008/0276810 A1* | 11/2008 | Ceja et al. | 99/485 |
| 2009/0272277 A1* | 11/2009 | Lawrence | 99/349 |
| 2012/0114812 A1* | 5/2012 | Lawrence | 426/231 |
| 2013/0019758 A1* | 1/2013 | Arevalo et al. | 99/334 |

* cited by examiner

Trays emerging from the dough depositing machine with cracker dough in place for the cracker finishing machine Gluten-free dough deposits displaying uneven thickness and spread as they are entering the back of the cracker finishing machine Perspective view of the cracker finishing machine 100

Front plan view of the cracker finishing machine 100

The cracker finishing machine 100 as seen from the front and within a manufacturing line, and with the lexan covers in place to shield moving parts The back of the finishing machine 100 with the belt conveyors 110 on the sides and the pedestal 120 in the down and waiting position A loaded baking tray 300 on the belt conveyor 110 being lifted off the roller conveyor 200 and drawn into the back of the finishing machine 100

The tray stops 140, in front of the pedestal 120, and as seen from the front of the finishing machine 100

The baking tray 300 being restrained by the tray stops 140 and being lifted from the belt conveyor 110, prior to pressing the product against the platen 130 (viewed from the front of the finishing machine)

The cracker press assembly 101 including the pedestal 120 and the platen 130 as shown for the back of the machine 100

Tray 300 moving onto the pedestal for finishing

Tray 300 resting on the pedestal 120 and being pressed against the platen 130

The underside of the pedestal 120 showing the pneumatic cylinders 122

Tray of finished crackers 400 exiting the front of the finishing machine 100 where the blotting belt 150 wrapped around the platen 130

Finishing machine covers removed to expose blotting belt 150 that wraps around the top and bottom of the stainless steel platen 130 in a continuous loop The blotting mechanism as seen from the back of the finishing machine 100 with the blotting belt 150 wrapped around rollers 152 on each side of the machine 100 and a pneumatic ram assembly 154 located in the lower center of the machine 100

The electric eye 156 which transmits data to the controls 502 and adjusts pneumatic actuator 154 to keep the belt 150 centered on its rollers 152

The door to the misting station 160 opened for inspection

Full view into the misting station 160 showing how a section of the continuous blotting belt 150 is sprayed with cooking oil Close up view of the mist sprayers 162 in the misting station 160 above the blotting belt 150

View of the misting station 160 from the opposite side from FIG. 17 showing the oil reservoir and pressure tank 164

Close-up view of the cooking oil and pressure tank 164 of misting station 160

The master control panel of controls 502

The pneumatic junction box 504

The baking tray stops are controlled by the pneumatic unit 142
which turns a lever that lifts and lower the stops The air control unit 124 for raising or lowering the pneumatic cylinders 122, that lift the pedestal 120, which may include a water filter to keep water out of the air lines

CRACKER FINISHING MACHINE

CROSS-REFERENCE TO RELATED APPLICATION

This application claims priority to U.S. Provisional Application No. 61/567,432 entitled, "CRACKER FINISHING MACHINE," filed on Dec. 6, 2011, the contents of which are incorporated herein as if set forth in full.

FIELD OF THE INVENTION

The present invention is directed to processes and equipment for manufacturing non-traditional baked products, especially products that are gluten-free and dairy-free or vegan (free of animal products). The invention has particular application to producing high quality dough-based products such as cookies, crackers, pretzels and the like, and is especially useful for cracker production which has been problematic using non-traditional doughs.

BACKGROUND

With the recent emergence of many important specialized product niches in the food marketplace, and the development of many non-traditional flour substances and dough products, commercial baking is going through a sea-change revolution. In particular, growth segments in the baking industry now involve the creation of healthful products that are "gluten-free," "wheat-free," "dairy-free," "egg-free," "vegan," and "allergy-friendly."

The development of such products often requires new approaches to both product formulation and product manufacture. Most notably, the elimination of traditional baking ingredients such as wheat, barley, rye, butter, and eggs cause manufacturing problems unforeseen in traditional bakery manufacturing. As these customary basic ingredients are central to the baking tradition, it is difficult to produce dough-based baked goods, such as cookies, crackers, and pretzels, without using the traditional wheat ingredients, which contribute gluten, or dairy products, such as milk and eggs, which provide texture, emulsification, and cohesion.

Yet, for health reasons, many consumers, need to eliminate gluten, dairy, animal products, and other substances that naturally occur in traditional bakery offerings, but that cause allergic reactions, disease, or offend modern ethical sensibilities. In particular, gluten produces an allergic reaction, or an autoimmune reaction know as celiac disease among an increasing number of individuals, giving cause to their need for "gluten-free" baked goods. To meet the needs of these important emerging markets, food companies are developing and manufacturing complex new doughs with properties that are substantially different from traditional mixtures.

Long-standing baking knowledge and manufacturing technology is dependent on the gluten properties of wheat based products and the properties imparted to dough by animal products such as milk and eggs. Non-traditional flour substances, such as brown rice flour, quinoa, nut flours, and dried vegetable flours and vegan dough prepared without the use of animal products all require new manufacturing processes and create substantially different products. In particular, conventional dough depositor production equipment is often inadequate to deal with the increasingly complex and difficult to manufacture dough that is created for vegan or gluten-free products. Uncommon product ingredients often result in tacky, tough, and inflexible dough which requires an entirely different type of manufacture.

When making certain products such as crackers, gluten-free or vegan recipes often create manufacturing problems that are associated with the reduced ability of the associated dough to retain water or deliver a symmetrical "spread" on the baking sheet. Broadly speaking, the traditional gluten levels, such as found in wheat flour, create a lighter dough with the oil and water contained in the product recipe being fully emulsified and texturizer by the gluten and any eggs or dairy products used in the recipes. Thus traditional gluten cracker dough made with animal products has a low density, a low level of stickiness, an airy texture. Accordingly, for example, when traditional methods are used to make crackers, the dough quickly spreads out for a short distance in a uniform manner when it is deposited onto a baking sheet, and it is then ready for baking.

SUMMARY OF THE INVENTION

Traditional dough and gluten-free and/or vegan dough are widely disparate in their properties and behavior on the baking sheet. Because gluten-free and/or vegan dough-based products such as crackers generally do not take a ready-to-bake shape when placed on the baking sheet, it has become necessary to invent a machine and associated processes that can finish and shape gluten-free and/or vegan dough for baking, as well as production systems incorporating the machine and processes. As well, and because gluten-free and/or vegan products often don't taste the same or have the same mouthfeel for the consumer, the appetite appeal of baked products, such as crackers, are improved if they resemble and crack like a traditional cracker made with gluten flour and animal products. Further, gluten-free and vegan products are found to be more acceptable in the diet when they seem "no different" than "regular" baked products. As used herein, "cracker" refers to a dough-based product that is generally brittle when baked so that it can be cracked by bending. In this regard, a cracker is generally thin—having a maximum thickness of no more than about ¼ inch and, more preferably, no more than about ⅛ inch—and generally has a substantially uniform thickness, i.e., it is generally flat as opposed to having a domed or other shaped profile.

As observed and reported in literature, gluten-free or vegan dough is generally heavier by volume, very tacky, dense, hard in texture, non-porous, often difficult to manipulate, and, importantly, unlikely to retain its water content when placed on the baking sheet in preparation for baking. For example, gluten-free or vegan cracker dough is very slow to spread, if at all, and is unlikely to spread in a symmetrical manner or to hold its water content for any extended period of time. Thus, without finishing, gluten-free or vegan crackers can be somewhat unattractive and very uneven in their thickness sitting on the baking tray. Without the intervention of a cracker preparation or finishing step in the manufacturing process, gluten-free or vegan crackers generally cook unevenly, often burning on the outside in their thinner areas, while remaining undercooked in thicker areas, such as the middle of the cracker.

This is a critical issue in manufacturing a gluten-free or vegan cracker. The already denser and harder dough tends to produce a harder cracker, one than can become so hard as to harm the teeth or the mouth. Therefore the cooking shape and thickness of a gluten-free or vegan baked item is critical in creating a cracker that seems like a traditional cracker, has appetite appeal, and is perceived as satisfying when eaten.

It is only with the emergence and eventual adoption of vegan and gluten-free flour products in the marketplace that the need for a dough flattening machine has been recognized. Traditional dough spreads well on a baking sheet and requires no flattening prior to baking. However, gluten-free or vegan dough may require finishing before entering the baking ovens to ensure an even bake and, in the case of crackers, a cracker-like appearance.

During the early years of gluten-free and/or vegan baking, the quantity of finished product was such that it was adequate for each baker to use low quantity methods such as a water glass, a porcelain cup, or other baking tool or kitchen equipment to flatten the dough to the desired thickness. However, as marketplace demand for gluten-free and vegan products increased it became necessary to find a finishing solution that could keep up with a bakery manufacturing to deliver industrial quantities, and thus to take a hand practice, which in itself was inadequate and uneven in its application, and to industrialize it. Hence, this invention rises from the need to efficiently manufacture and bake gluten-free or vegan baked products in industrial quantities.

As there was no need to flatten or mash dough in traditional baking, significant ingenuity was required to envision a way to quickly shape and equalize the thickness of each cracker on a baking sheet and within a rapid conveyor fed manufacturing line. It is believed that there is no other piece of manufacturing equipment like this in baking or cracker manufacturing, and the idea of flattening or mashing gluten-free or vegan cracker dough or otherwise processing such dough to prepare it for baking is itself an innovation.

A number of factors were involved in inventing gluten-free and vegan baking manufacturing equipment adequate to finishing the products for oven baking. The final machine needed to be able to effectively manage dough products is as follows:

1. Managing Gluten-Free and Dairy-Free/Vegan Dough

Traditional bakery products contain both gluten and dairy products, such as eggs, that work together to bond oil and water together and thereby to emulsify and texturize dough for shaping and baking. These ingredients bind together the oil and water in a recipe to create homogenous dough that retains moisture and captures air to produce a light and fluffy dough that is soft and retains moisture both before and after it has been baked. By virtue of its ability to emulsify ingredients, gluten produces dough that spreads quickly, evenly, and consistently on a baking sheet, resulting in a homogenous substance of uniform thickness and a symmetrical and predictable shape. After baking, the final product possesses an agreeable mouthfeel, and it is easy to chew.

The absence of gluten and dairy products greatly influences the character of the dough and the texture of baked products. Lacking ingredients that naturally emulsify and texturize dough, and lacking the ability to absorb water, in general, gluten-free dough is tough, hard, stiff, intractable and difficult to manage, contains less air, is dry, sticky, and lacking stretch and fluidity. For these reasons, baking recipes that lack gluten and dairy products may be unable to bind oil and water molecules together, resulting in separation during the manufacturing process. Consequently, once gluten-free and/or vegan dough is separated into appropriately sized portions and is deposited on a baking sheet for baking, it generally lumps and varies widely in shape and thickness, begins to leak moisture and oil, spreads unevenly, and becomes increasingly asymmetrical with the passage of even short periods of time.

Thus, from a manufacturing perspective, a finishing machine must process or "finish" each product for baking to ensure consistent thickness, and to shape each individual product so it looks as much like a traditional gluten-containing product as possible when it reaches the baking oven.

2. Enhance Moisture Retention

Traditional gluten dough presents few difficulties in manufacturing. It quickly absorbs up to two times its weight in water, to offer a highly pliant and moldable mass that becomes increasingly emulsified and of a desirable texture as it is handled during the manufacturing process. During the manufacturing process it can be handled substantially without any loss of water or moisture. Essentially, once it has been kneaded and is placed on the baking pan, it is ready for baking without any further processing.

Gluten-free and/or vegan dough presents a number of challenges that are not addressed with traditional baking equipment. Lacking an inherent emulsifier, it takes 60% longer to absorb water, and even then it only absorbs one-third of its weight in water, and quickly losses its moisture if let set for any length of time. Consequently, gluten-free and/or vegan dough is also very sticky because its water content is so low. Gluten-free and/or vegan dough begins to seep liquid once the mixing of the recipe has been completed, and continues to leak moisture from the beginning of the manufacturing process until the product has been properly baked.

Therefore manufacturing equipment needs to process gluten-free and/or vegan dough quickly, with a minimum of handling or exposure to higher temperatures to minimize moisture loss, and it needs to further moisturize the products during the finishing process for the final leg along the conveyor to the baking oven. The present invention, in its various aspects, addresses these concerns and objectives to enable consistent production of high quality gluten and/or vegan baked products, including products such as crackers that have been difficult to produce even in small quantities, let alone in industrial contexts.

In accordance with one aspect of the present invention, a method and apparatus ("utility") is provided for finishing a non-traditional dough that is gluten-free and/or animal product free. Such "finishing" refers to processing conducted after ingredients have been combined to form dough, but before the baking has been completed to form a baked product. For example, a finishing machine may be interposed, in an industrial manufacturing process, between a dough depositing machine that deposits dough on baking sheets and an oven for baking the dough to yield the finished products.

The utility involves obtaining the non-traditional dough (e.g., by receiving baking trays having the dough deposited thereon), operating a dough finishing machine to perform at least one process on the deposited dough to prepare the non-traditional dough for baking, and dispensing the processed dough from the dough finishing machine for baking (e.g., by depositing the baking trays onto an output conveyor for delivery to the oven. As noted above, non-traditional doughs typically do not spread evenly on a baking sheet and tend to leak water. In this regard, the process(es) performed on the dough may include forming the dough into a shape desired for baking and/or moisturizing the dough. The dough may be formed to the desired shape by applying pressure to deposited dough portions, e.g., by pressing a cooking tray with dough portions on it against a platen. For example, to make crackers, the dough portions may be pressed such that they have a substantially uniform thickness. The dough may be moisturized by applying cooking oil to a blotting belt and then interposing the blotting belt between the dough and platen during pressing, thereby concomitantly forming and moisturizing the dough.

In accordance with another aspect of the present invention, a system is provided for producing baked products from non-traditional dough in an industrial manufacturing process. The system includes: a dough depositor operable to deposit predetermined amounts of non-traditional dough onto a baking surface; a dough finisher operable to perform at least one process on the deposited non-traditional dough to prepare it for baking; an oven for baking non-traditional dough; and a transport mechanism for transporting the baking surface between the dough depositor, the dough finisher and the oven. In one embodiment, the system is operative for making crackers from non-traditional dough. The dough finisher may form the dough to a desired shape for baking and/or moisturizing the dough.

BRIEF DESCRIPTION OF THE DRAWINGS

For a more complete understanding of the present invention and further advantages thereof, reference is now made to the following detailed description, taken in conjunction with the drawings, in which.

DETAILED DESCRIPTION

The present invention relates to processing non-traditional doughs that are difficult to manage in a manufacturing process because they are gluten-free and/or free of animal products or vegan. The manufacturing system of the present invention includes a finishing machine that may be interposed between a dough depositor machine and an oven. The finishing machine may perform various functions to prepare the dough for baking including shaping the dough and moisturizing the dough. In the following description, the invention is set forth in the specific context of manufacturing crackers from the non-traditional dough, which is a particularly challenging application. In this context, the finisher is operative to press the dough into a flat cracker profile and moisturize the dough. While this is a particularly advantageous application of the invention, the invention is not so limited.

The "cracker finishing machine" is a piece of industrial manufacturing equipment that is capable of processing or "finishing" unbaked gluten-free, dairy-free and/or vegan (animal product free) dough into crackers for baking. The machine is notable in its ability to quickly process unbaked dough to forestall moisture loss, set cracker spread or diameter, ensure consistent thickness, moisturize for baking, and shape each individual cracker so it looks like a traditional gluten-containing cracker.

Figure 1:
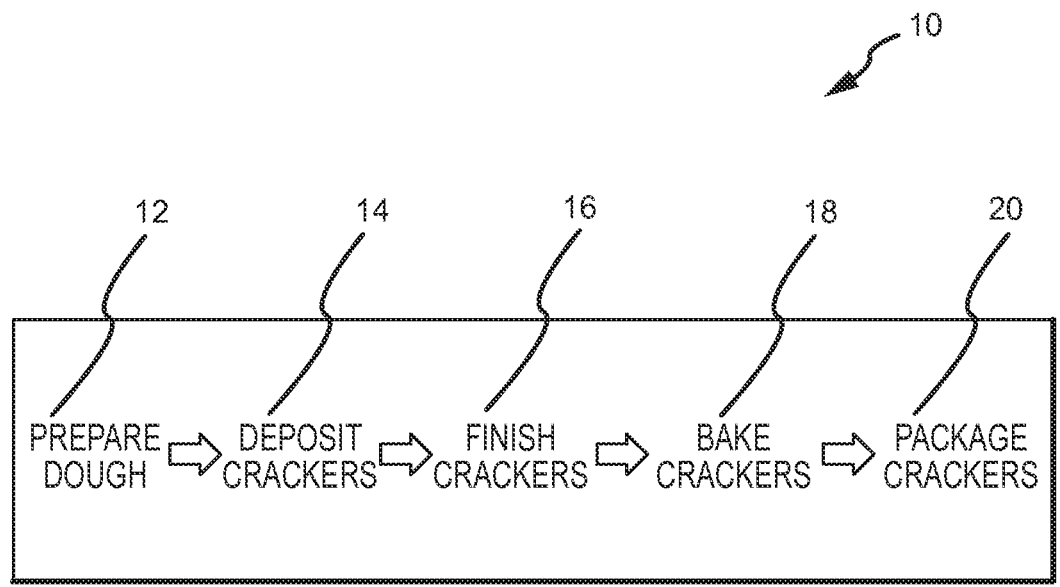
FIG. 1 is a process flow diagram illustrating a process for manufacturing crackers in accordance with the present invention.

In an industrial setting, the cracker manufacturing process 10, as generally shown in FIG. 1, begins with the preparation (12) of the recipe in a large mixing vat wherein the ingredients for gluten-free or vegan cracker dough are mixed and prepared for transport into a dough depositor machine. One such example of a process for preparing gluten-free or vegan dough and associated dough depositing machine is described in U.S. patent application Ser. No. 13/097,247, which is incorporated herein by reference. In any regard, vegan or gluten-free dough may be prepared that has the properties described above that are characteristic of vegan or gluten-free dough that may necessitate the use of a finishing machine in contrast to traditional gluten flour dough prepared using wheat flour and/or animal products.

Figure 2A:
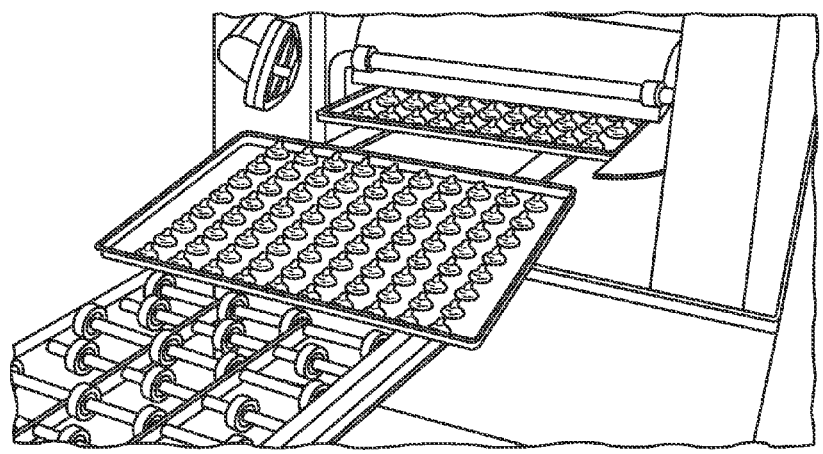
FIG. 2A shows cooking trays emerging from a dough depositing with cracker dough in place for the cracker finishing machine in accordance with the present invention.

In a preferred implementation, the dough depositor machine acts to place 80, equally placed, approximately ¼ ounce deposits (14) of unbaked gluten-free and vegan cracker dough onto a 26" wide baking sheet or tray. Thereafter, the loaded baking tray is transported by a conveyor system to the cracker finishing machine that is described in detail below. FIG. 2A shows trays emerging from the dough depositing machine with cracker dough in place for the cracker finishing machine. Once the finishing (16) is complete, the loaded baking tray re-enters the conveyor and is transported to a conventional baking oven to be cooked. Though the oven may be conventional, it is programmed e.g., with temperature and time settings appropriate for the unconventional dough being utilized. Once the product is baked (18), the crackers are removed from the baking trays, packaged (20), placed in inventory, and shipped into the marketplace. The process of packaging may be manual or automated, though automation is advantageous for industrial production levels as noted below. It generally involves sealing a number of crackers in air tight packages and then enclosing one or more of such packages in a box for retail sale.

The Operation of the Cracker Finishing Machine

Figure 3A:
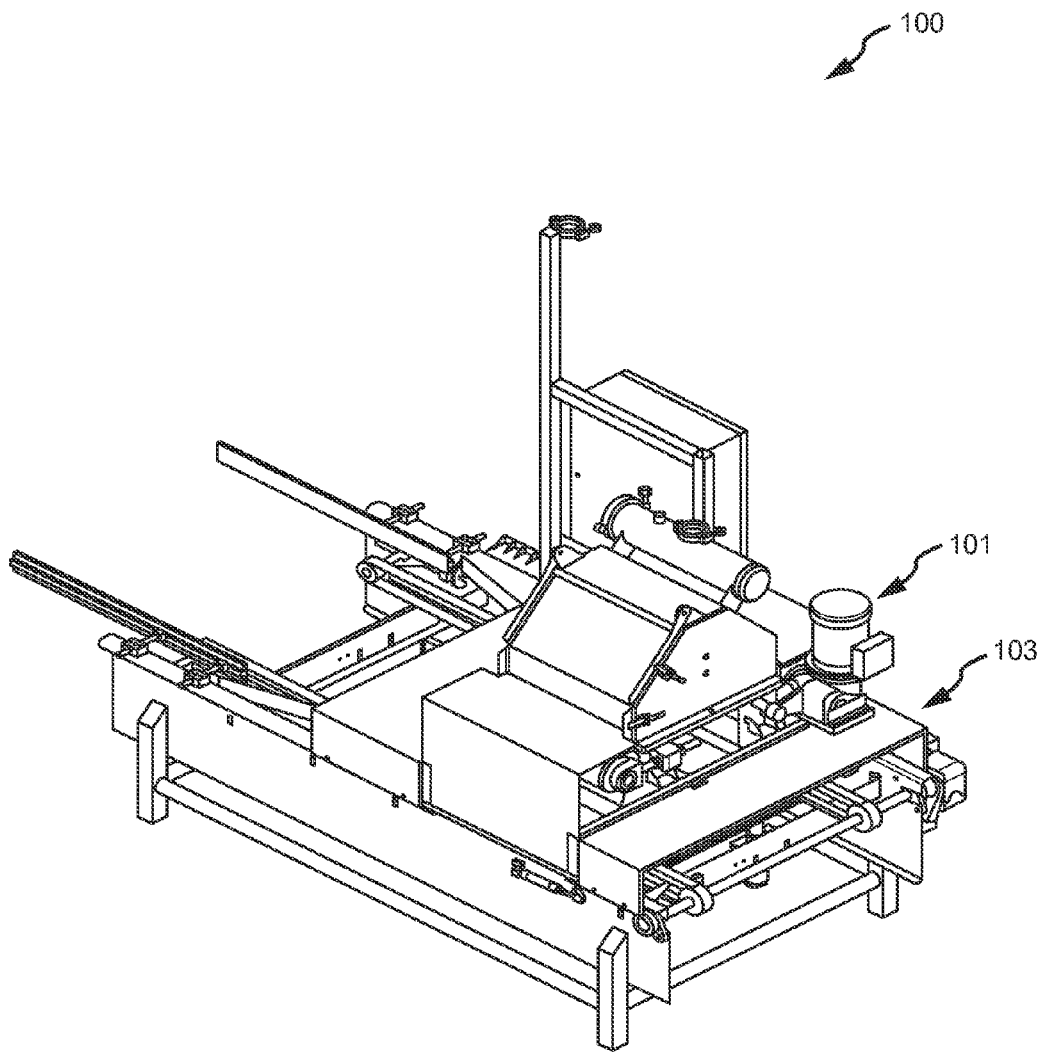
FIG. 3A shows a perspective view of the cracker finishing machine in accordance with the present invention from the front of the machine.
Figure 3B:
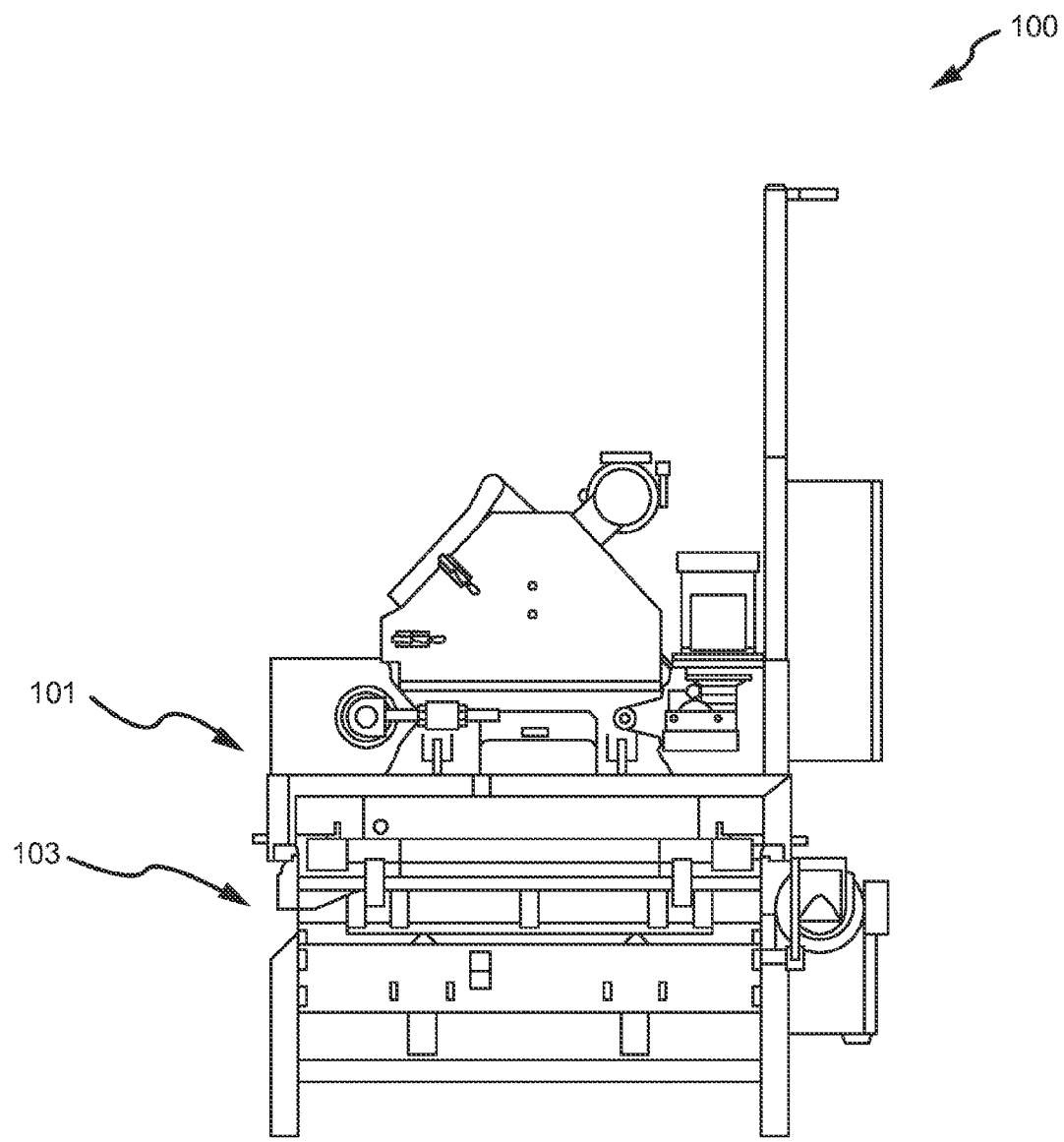
FIG. 3B shows a front plan view of the cracker finishing machine of FIG. 3A.

As each baking sheet is filled it is ejected from the dough depositor machine onto a stainless steel roller conveyor which carries the loaded baking tray directly into the back end opening of the cracker finishing machine. Perspective and front views, respectively of a cracker finishing machine 100 are shown in FIGS. 3A-3B. The cracker finishing machine 100 generally includes a cracker press assembly 101 and a tray conveyor assembly 103.

Figure 2B:
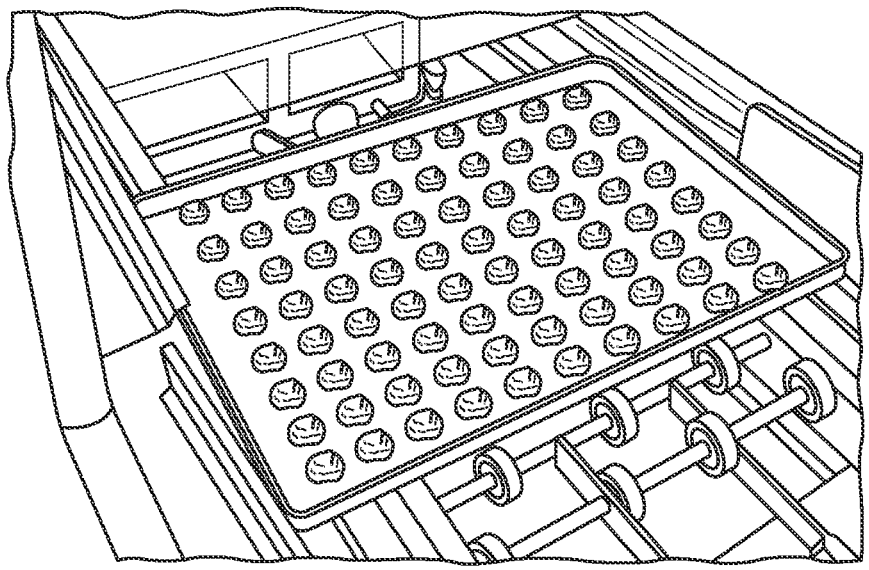
FIG. 2B shows gluten-free dough deposits displaying uneven thickness and spread as they are entering the back of the cracker finishing machine of FIG. 2A.

In a traditional gluten flour baking operation, the deposited crackers would automatically spread to their optimal baking shape on the tray within seconds of being deposited, and would proceed directly to the baking ovens without any further preparation. However, with gluten-free and vegan dough, the deposited dough will take no beneficial baking shape, and in fact will immediately begin to leak water and spread into irregular shapes. FIG. 2B illustrates gluten-free dough deposits displaying uneven thickness and spread as they are entering the cracker finishing machine 100. Baked as such, a gluten-free or vegan cracker would bake unevenly, be hard and difficult to consume, lack a flat surface making it commercially unacceptable, and, importantly, lack functionality or the ability to be used with a spread, dip, condiments, and prepared foods. While crackers are used in many culinary contexts, they are most commonly used as a vehicle for other foods. Crackers that lack a uniform level surface and are not shaped in a roughly round or square shape are hard to prepare, handle, and consume.

This invention addresses problems of baking non-dairy, vegan, gluten-free dough in an industrial context. Most notable is that the machine finishes unbaked non-traditional dough for baking with minimal loss of moisture, consistent spread or diameter, constant thickness, and a finished look and feel that ensures that the resulting cracker is suitable for all of the culinary uses to which crackers are put. Thus gluten-free crackers can easily become a part of the lifestyle enjoyed by celiacs and those who require wheat-free or vegan foodstuffs for health or ethical reasons. As used herein, the term non-traditional dough refers to gluten-free dough and/or vegan dough made without the use of animal products such as milk or eggs.

The Operation of the Machine During the Manufacturing Process

Figure 3C:
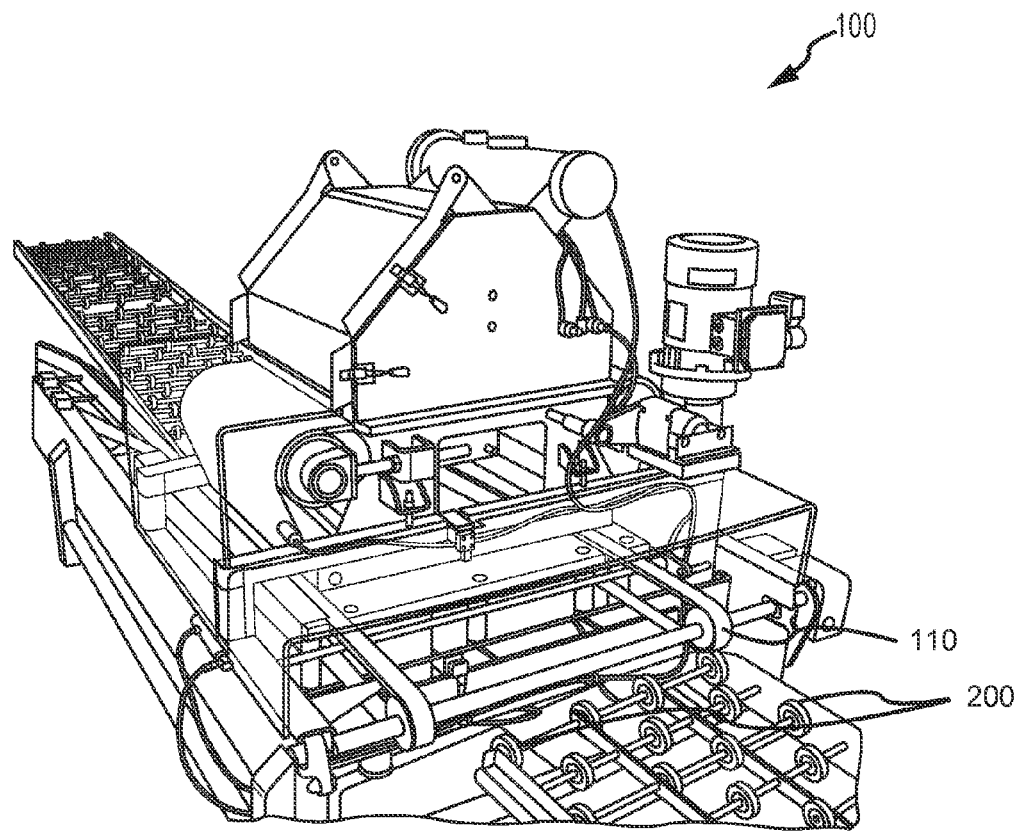
FIG. 3C is a perspective view of the cracker finishing machine of FIG. 3A as seen from the front and within a manufacturing line, and with the machine covers in place to shield moving parts.
Figure 4:
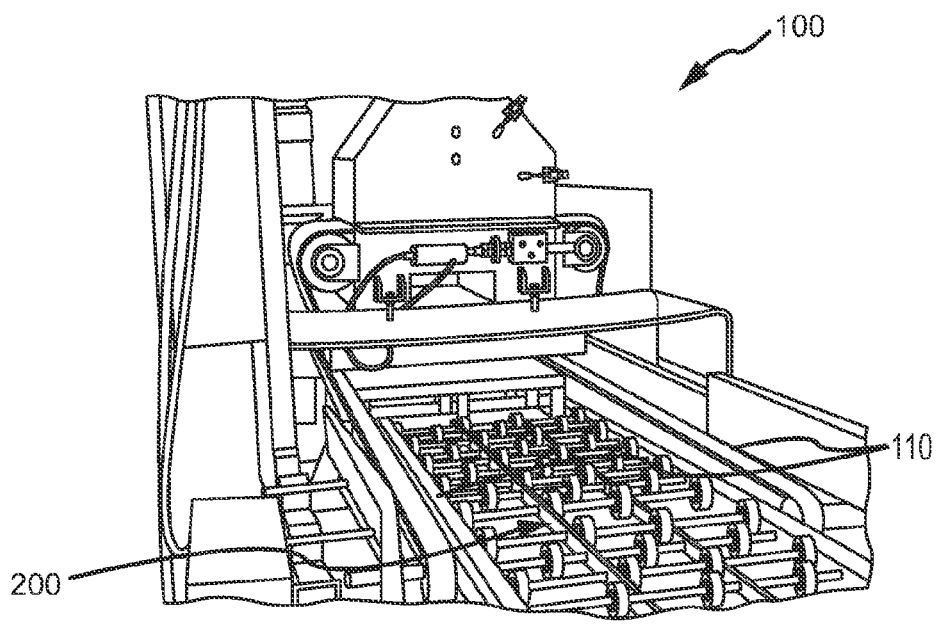
FIG. 4 shows the back of the finishing machine of FIG. 3A with the belt conveyors on the sides and the pedestal in the down and waiting position.
Figure 5:
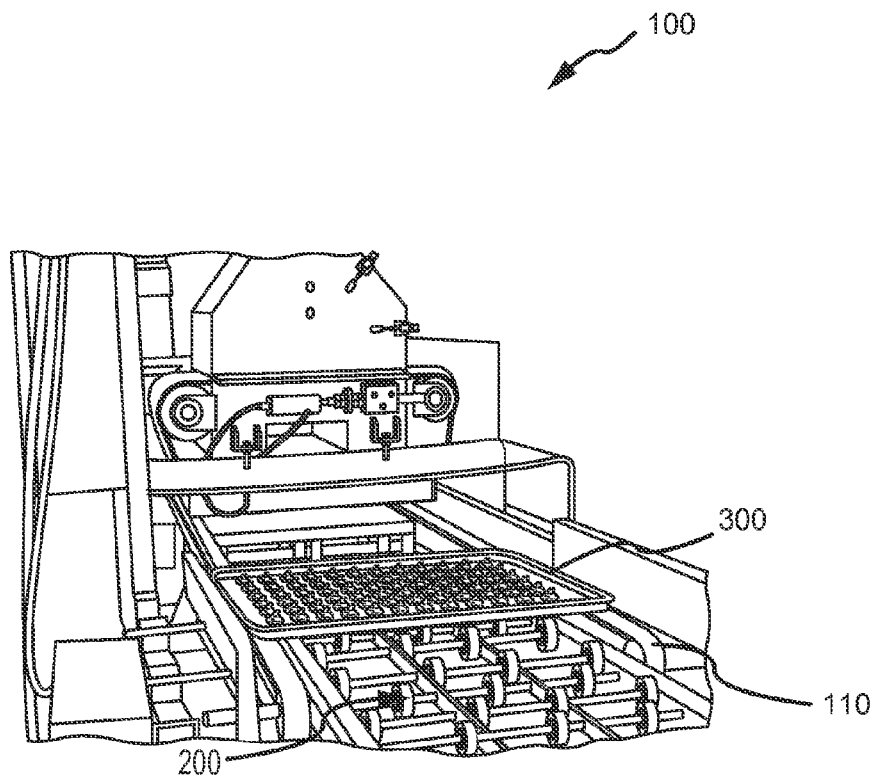
FIG. 5 shows a loaded baking tray on the belt conveyor being lifted off the roller conveyor and drawn into the back of the finishing machine of FIG. 3A.
Figure 6:
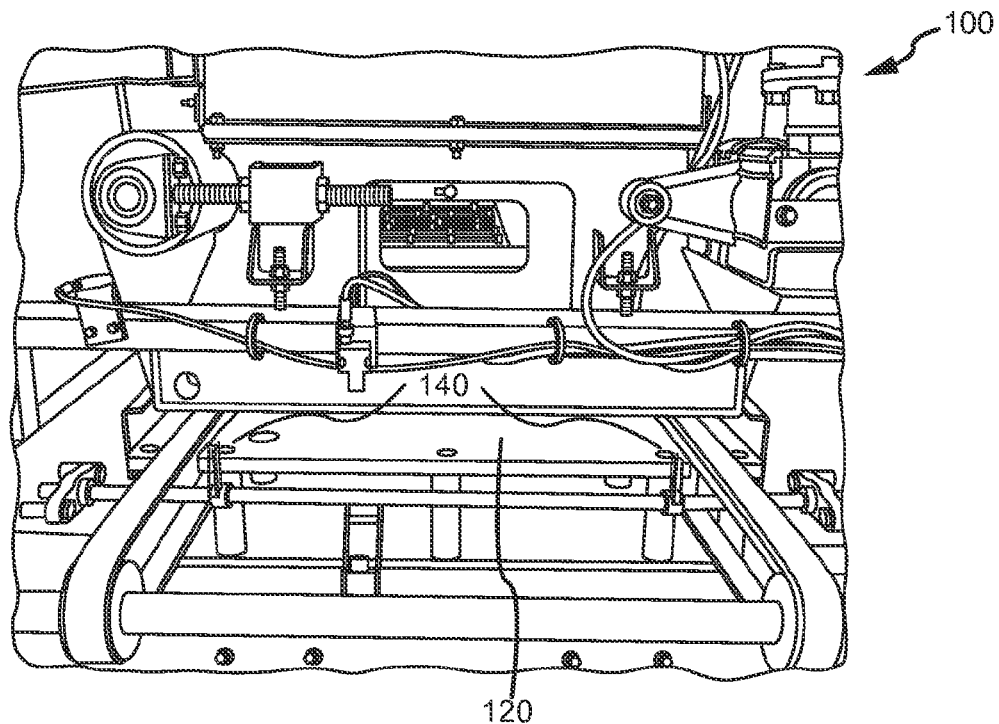
FIG. 6 shows the tray stops as seen from the front of the finishing machine of FIG. 3A.

FIG. 3C shows the cracker finishing machine 100 installed in a manufacturing setting. Placed between the dough depositor machine and the baking ovens, and located on the conveyor that carries loaded baking trays between the depositor and the ovens, the machine 100 is ready to process loaded trays.

The machine 100 includes a complex set of units interacting in a coordinated fashion, as follows:

1. The Belt Conveyor

A belt conveyor system 110 designed to lift each baking tray off the stainless steel roller conveyor 200 and to transport the baking tray 300 to the cracker press pedestal 120, and then after the cracker is finished to carry the baking tray 300 away from the finishing machine 100 and back onto the stainless steel conveyor 200.

2. Tray Stops

Tray stops 140 that are designed to stop the forward motion of the baking tray 300 when it is over the center of the pedestal 120, and later to release the tray when the cracker finishing is complete so that the belt conveyor 110 can return it to the stainless steel roller conveyor 200.

3. The Cracker Press

The cracker press includes a pneumatic pressing station 122 that lifts and lowers each tray and presses the raw dough at a fixed tension for a predetermined time against a fixed stainless steel platen 130. The platen 130 provides the counter-weight to create the form and imprint each cracker in a uniform manner.

4. The Blotting Belt

The blotting belt 150 is a large flexible belt that is in between the platen 130 and the loaded baking tray 300. It wraps around the fixed platen 130 and advances at fixed intervals to present a new, lightly oiled blotting surface to prevent dough from sticking to the platen 130 and moisturize the dough.

5. Product Moisturization

The misting station 160, or oil spraying station, that sprays an appropriate amount of cooking oil to the dough facing side of the blotting belt 150 to moisturize each individual cracker during the pressing process.

6. Operational Controls

The controls 502 include an electronic controlling station that operates the cracker finishing machine, understood as the coordination and complete orchestration of the finishing process and the split-second activities of the machine.

Each of these units is described in more detail below.

1. The Belt Conveyor

A belt conveyor system 110, extending internal to the cracker finishing machine 100, lifts each baking tray 300 off the roller conveyor 200 as it arrives at the back of the machine 100 and advances the baking tray 300 onto the pedestal 120 where it is stopped by pneumatic tray stops 140 which rise to stop the forward movement of the tray 300 prior to lifting. The stops 140 act to stop and square the forward motion of each baking tray 300 centering it on the pneumatic pedestal 120 below the immobile platen 130. Then, after the finishing process, and when the stops 140 have been retracted, the baking tray 300 is again carried forward to return to the conveyor 200 heading to the baking oven. The belt conveyor 110 carries the loaded baking tray 300 into the machine 100, and once the cracker finishing has been complete, it carries the finished baking tray 300 out of the front of the machine 100 and delivers it to the roller conveyor 200 for transport to the baking ovens.

2. The Tray Stops

Figure 7:
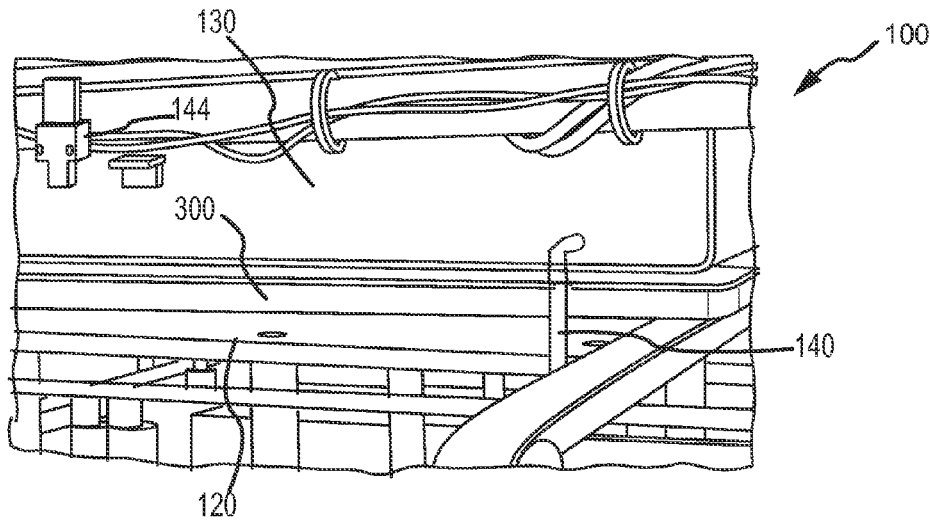
FIG. 7 shows the baking tray being restrained by the tray stops and lifted from the belt conveyor prior to pressing the product against the platen of the finishing machine of FIG. 3A.
Figure 8:
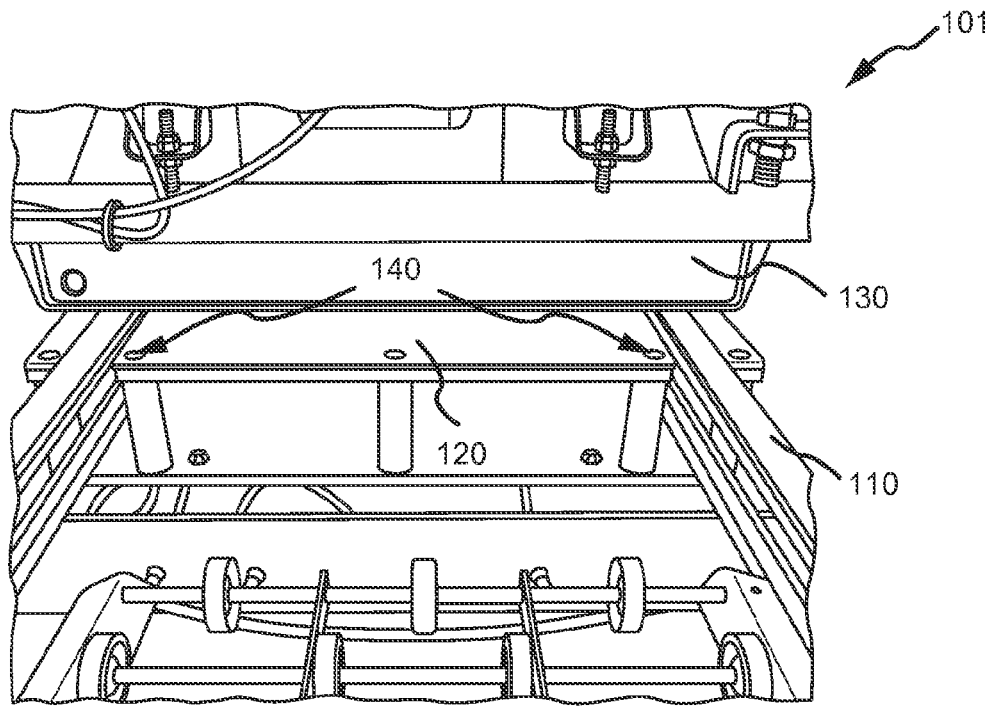
FIG. 8 shows the cracker press assembly of the finishing machine of FIG. 3A including the pedestal and the platen.
Figure 9:
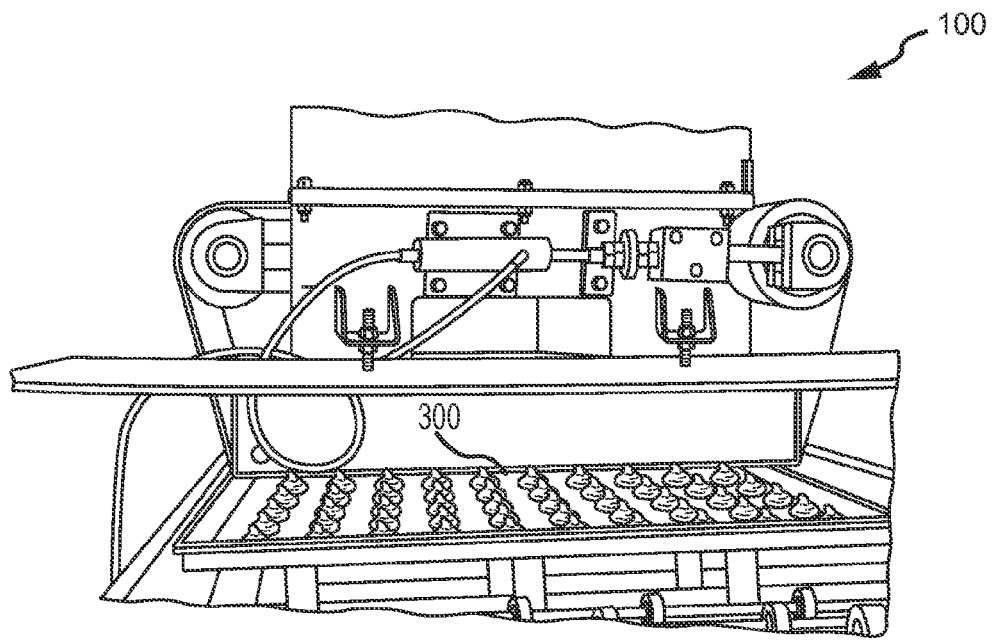
FIG. 9 shows a tray moving onto the pedestal of the finishing machine of FIG. 3A for finishing.
Figure 10:
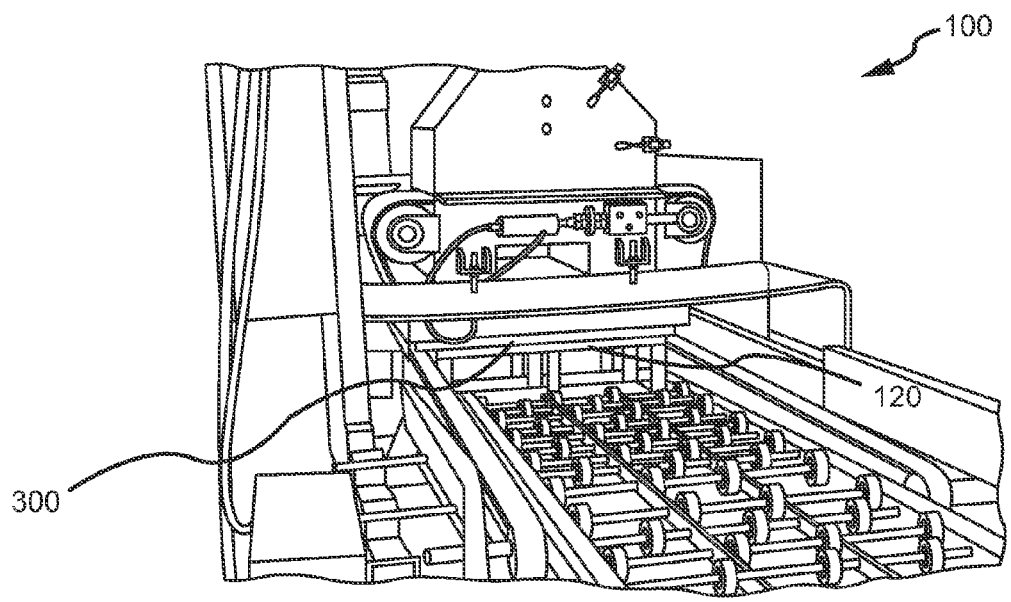
FIG. 10 shows a tray resting on the pedestal of the finishing machine of FIG. 3A.
Figure 11:
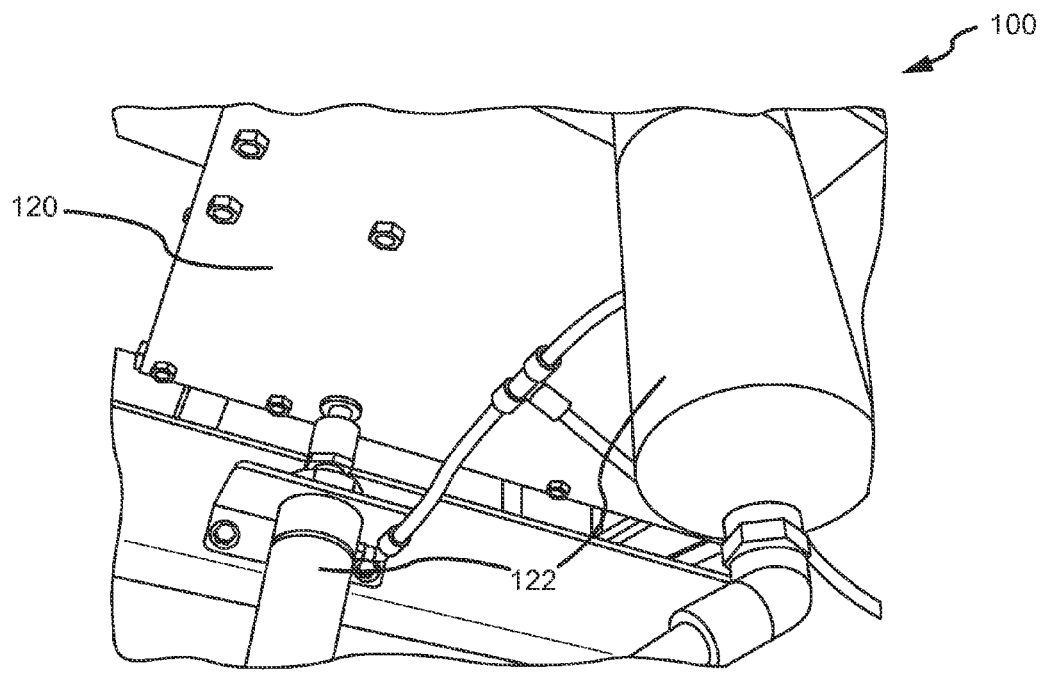
FIG. 11 shows the underside of the pedestal of the finishing machine of FIG. 3A including the pneumatic cylinders.

The tray stops 140 acts to arrest the forward movement of the loaded baking tray 300 and to situate the tray 300 on the pedestal 120 inside the cracker finishing machine 100. They are located on the front of the machine 100, just in front of the pedestal 120, and moved into position by a pneumatic system once the previous tray has been finished and has moved off the pedestal 120. FIG. 7 shows the baking tray 300 being restrained by the stops 140 and lifted from the belt conveyor 110 prior to pressing the dough against the platen 130 (viewed from the front of the machine).

In the operation of the machine 100, the baking tray 300 is transported into a press area of the machine 100 by the belt conveyor 110, and stopped at a selected location by the tray stops 140 on the front of the machine 100. After the baking tray 300 is lifted from the belt conveyor 110 by the pedestal 120 (as will be described in greater detail below), the stops 140 may be lowered. In this regard, a sensor 144 (e.g., a photo eye, proximity sensor, or other appropriate sensor) may be provided to detect a baking tray 300 exiting the machine 100. That is, once the baking tray 300 is lowered back onto the belt conveyor 110 after undergoing a press cycle, the belt conveyor 110 may transport the baking tray 300 out of the machine 100 so that the stops 140 may have been retracted out of the way of the baking tray 300. Once the sensor 144 detects that the baking tray 300 has been transported out of the machine 100, the stops 140 may again be raised to stop the next baking tray 300 entering the machine 100.

3. The Cracker Press

The cracker press forms the center of the cracker finishing machine 100. It primarily includes a pneumatic lifting and pressing station that lifts and lowers each baking tray 300 and presses the raw dough on the baking tray 300 at a fixed pressure and for a predetermined time against the immobile platen 130 to moisturize the dough for baking, to give the dough a substantially uniform thickness and to give the crackers a desirable imprint and appearance.

The pedestal 120 is made of aluminum and is coated with ultra high molecular weight (UHMW) polyethylene plastic, a very tough polymer which resists abrasion and reduces friction or drag. Because the belt conveyor 110 continues to move even when the baking tray 300 has been stopped on the pedestal 120 by the tray stops 140, it is important to have a low coefficient of friction to keep the belt conveyor 110 from torquing the tray 300 while it waits to be lifted off the belt 110 and pressed up against the platen 130.

The pedestal 120 is mounted directly on four pneumatic cylinders 122 that operate in unison to lift each baking tray 300 until it meets the immobile platen 130 that is located directly over the pedestal 120 to form its counter-weight.

The upper platen 130 consists of an immovable stainless steel block that is surrounded by a non-stick blotting belt 150 that forms a blotting surface between the platen 130 and the dough deposits that are sitting on the baking tray 300. The steel block of the platen 130 is shaped to fit inside the baking tray 300 and to completely meet the dough in the baking tray 300, thus producing the desired surface on the top of each cracker.

Figure 12:
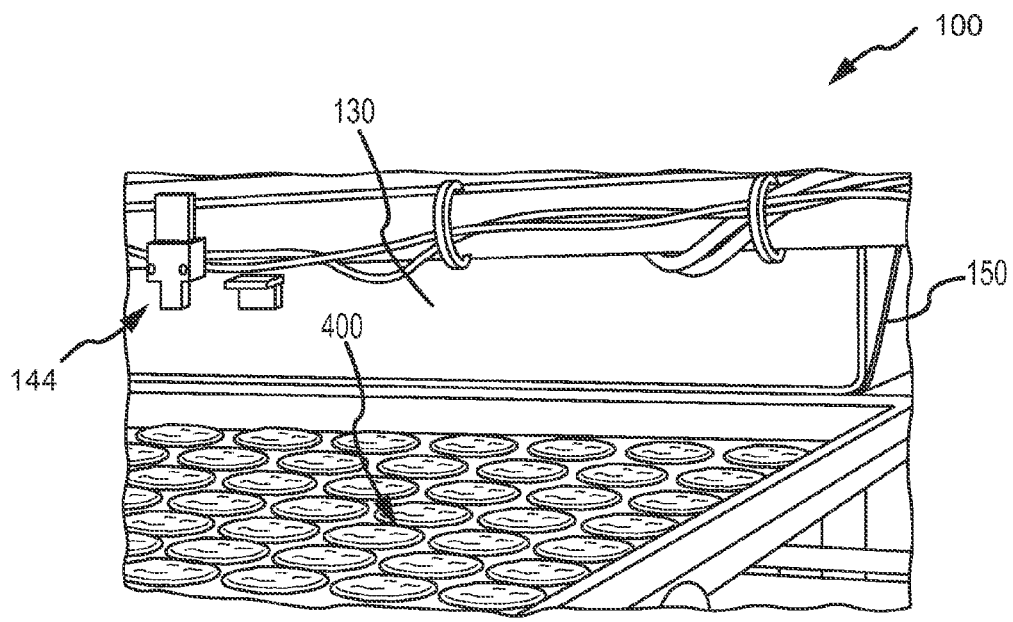
FIG. 12 shows a tray of finished crackers exiting the front of the finishing machine of FIG. 3A where the blotting belt is wrapped around the platen.

At this point in the manufacturing process, the gluten-free dough deposits have been prepared for baking by flattening each deposit for uniform baking. As well, each individual cracker has been given a shape becoming to a cracker. FIG. 12 shows a tray of finished crackers 400 exiting the front of the machine 100. The blotting belt 150 is wrapped around the platen 130.

4. The Blotting Belt

To prevent the dough from sticking to the stationary surface of the platen 130, a lightly oiled belt 150 is wrapped around the platen 130, and is thereby suspended between the dough on the baking tray 300, and the bottom face of the platen 130. The blotting belt 150 comprises a continuous lightly waxed flexible belt with a soft and depressible surface. The raw dough deposits are thereby insulated from the stainless steel surface of the platen 130 to prevent sticking, while the surface of the belt 150 moisturizes the dough prior to baking.

Once the tray 300 is in place on the pedestal 120, the blotting surface of the belt 150 is automatically advanced a distance equal to the width of the tray 300 to be finished. Then the tray 300 is lifted off the continuous belt conveyor 110 and pressed against the blotter-backed steel surface of the platen 130 for a predetermined length of time, thereby flattening all the uncooked dough deposits sitting on the baking tray 300 and giving them a desired thickness (e.g., ⅛") for baking and the imprint of their cracker-like shape and appearance.

Figure 13:
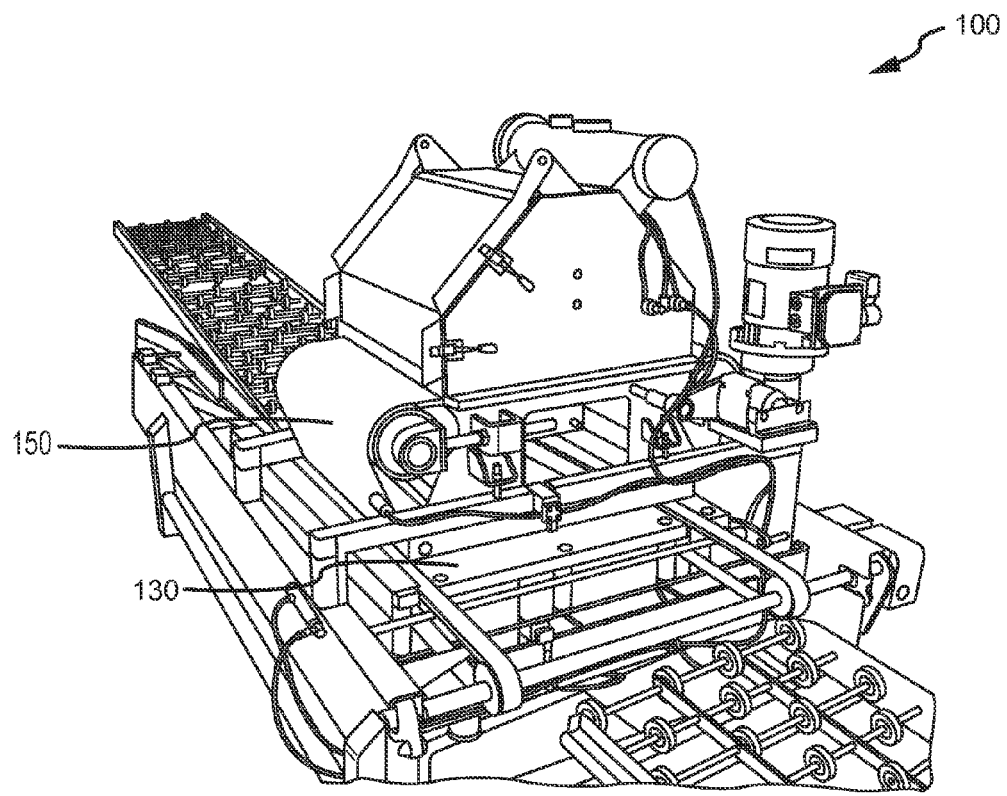
FIG. 13 shows the finishing machine of FIG. 3A with the covers removed to expose the blotting belt that wraps around the top and bottom of the stainless steel platen in a continuous loop.

At the top of the press cycle the baking tray 300 is compressed against the flexible blotting belt 150 at 20-60 psi for about 1-2 seconds (the pressure and duration being controllable via an interface of controls 502, e.g., to optimize the qualities of the finished product or accommodate different dough compositions or other operating conditions), with the preferable time being about 1.5 seconds. FIG. 13 shows the machine 100 with its covers removed, such that the blotting belt 150 is revealed. As shown, the belt 150 wraps around the top and the bottom of the stainless steel platen 130 in a continuous loop.

Figure 14:
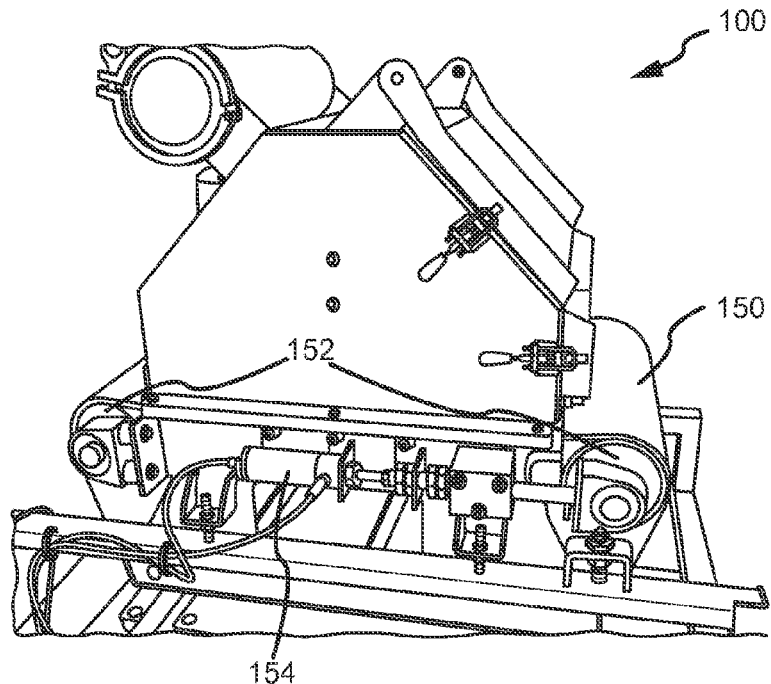
FIG. 14 shows the blotting mechanism as seen from the back of the finishing machine of FIG. 3A with the blotting belt wrapped around rollers on each side of the machine and a pneumatic ram assembly located at the lower center of the machine.

FIG. 14 shows the blotting mechanism as seen from the back of the machine 100, with the blotting belt 150 wrapped around a roller 152 on each side of the machine 100. A actuator 154 is located at the lower center of the machine 100.

Figure 15:
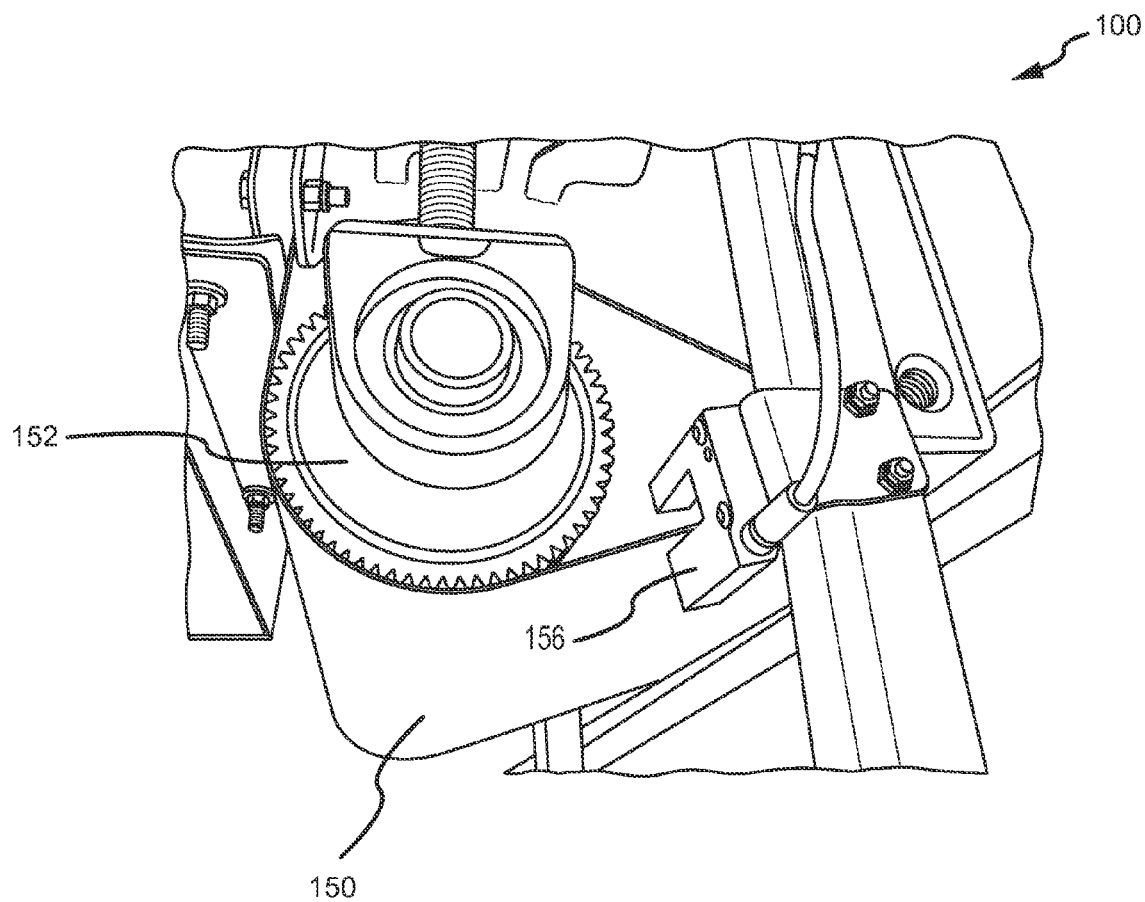
FIG. 15 shows the electric eye which transmits data to the controls of the finishing machine of FIG. 3A and adjusts a pneumatic actuator to keep the belts centered on its rollers.

FIG. 15 shows the electric eye 156 which transmits data to a controls 502 and adjusts a pneumatic actuator 154 to keep the belt 150 centered on its rollers 152.

The belt 150 is supported on rollers 152. Belt placement on the rollers 152 is controlled by an electric eye 156. Other appropriate sensors may also be used to monitor the position of the blotting belt 150 on the rollers 152. The eye 156 senses whether the belt 150 is migrating toward one end or the other of the rollers 152, and the pneumatic actuator 154 is used to adjust the angle of the axis of the rollers 152 to selectively incline the belt 150 in relation to the center of the rollers 152. The belt 150 may be cleaned, for example, after the production of 1800 lbs. of gluten-free dough.

The blotting belt 150 is thus kept centered on the rollers 152 at each end of the platen 130 with a pneumatic actuator 154 which constantly adjusts the rollers 152 backwards and forwards to keep the belt 150 centered on each roller 152. The exact location is tracked by an electric eye 156, which communicates with the operational controls and adjusts the rollers 152 accordingly with the pneumatic actuator 154.

5. The Moisturization Process

Figure 16:
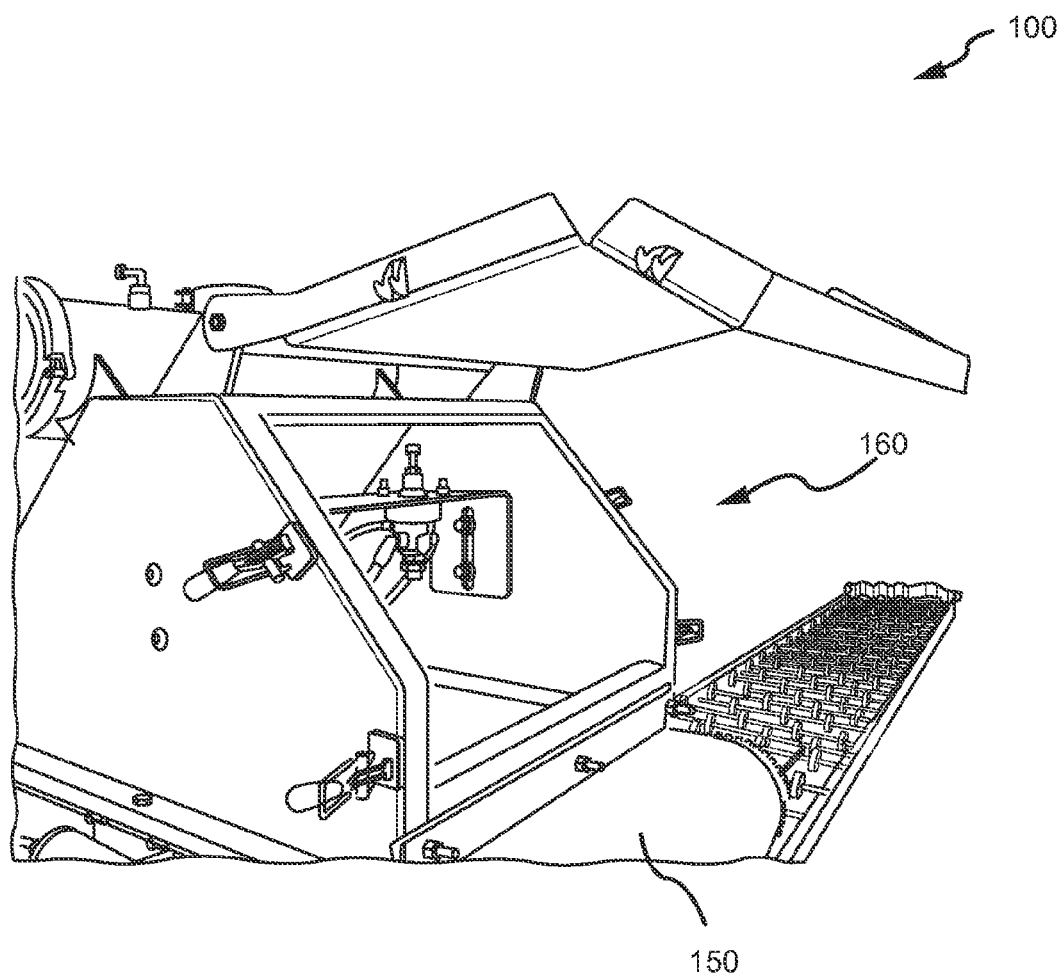
FIG. 16 shows the door to the misting station of the finishing machine of FIG. 3A open for inspection.
Figure 17:
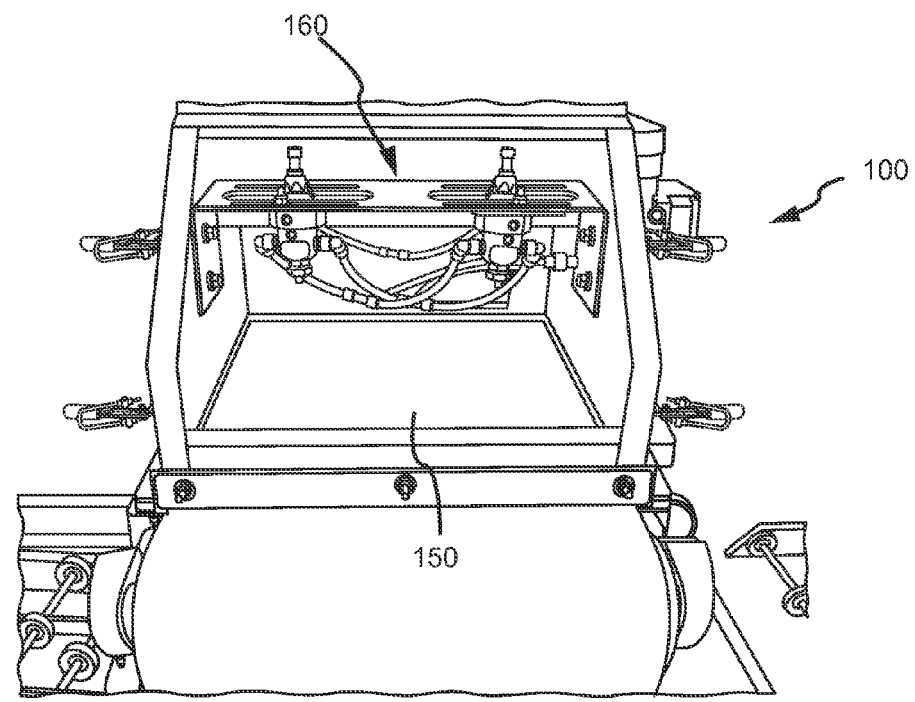
FIG. 17 shows a full view into the misting station of the finishing machine of FIG. 3A showing how a section of the continuous blotting belt is sprayed with cooking oil.

The moisturization process is executed at a misting station 160 that coats the dough side of the next segment of the blotting belt 150 with cooking oil to seal each pressed cracker, lock in its moisture, and prepare it for baking. Because gluten-free, vegan dough bakes differently than gluten, dairy dough, and is otherwise unlikely to brown in the baking ovens, the moisturization step increases the likelihood of browning. FIG. 16 shows a door to the misting station 160 being opened for inspection. FIG. 17 shows a full view into the misting station 160 showing how a section of the continuous blotting belt 150 is sprayed with cooking oil inside the misting chamber.

Figure 18:
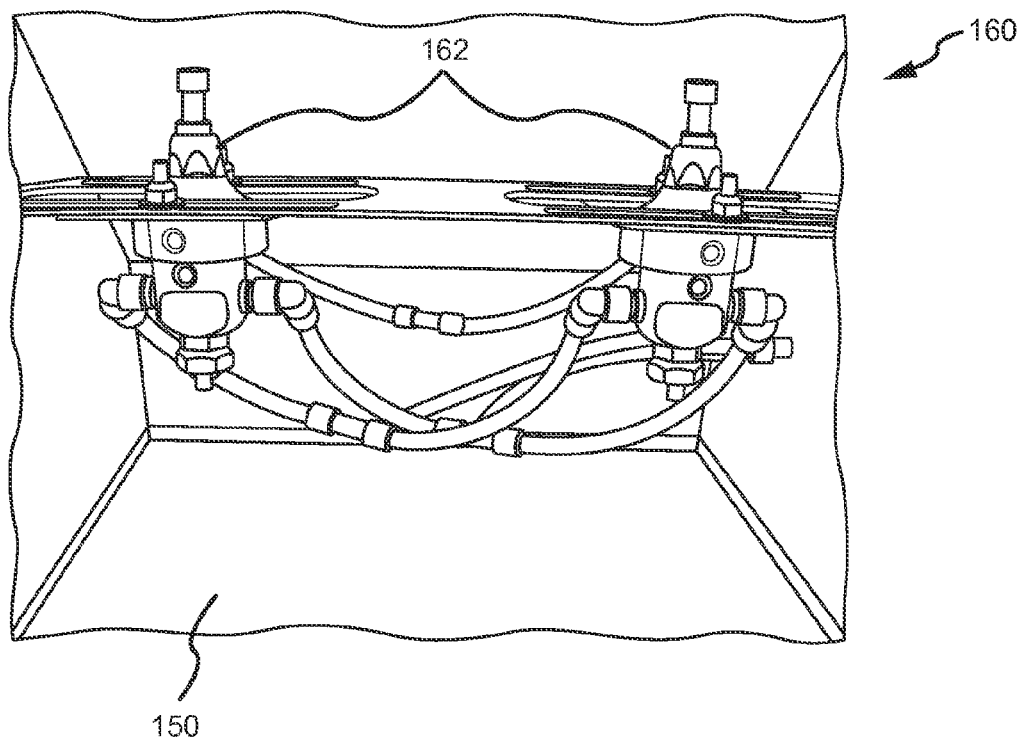
FIG. 18 shows a close up view of the mist sprayers in the misting station of the finishing machine of FIG. 3A above the blotting belt.

FIG. 18 shows close-up view of the mist sprayers 162 in the misting station 160 above the blotting belt 150.

The blotting belt 150 is disposed at a right angle with respect to the belt conveyor 110, and may be advanced with the arrival of each new tray 300 of unpressed dough. Within the misting station 160, the surface of the belt 150 is lightly misted, under 5.5 to 7 psi, with 6.25 psi being the preferred, with an appropriate cooking oil before the dough is pressed.

For example, the blotting belt 150 may be advanced the width of one full baking sheet 300 immediately after each tray of crackers is finished, and be readied for the next baking tray 300. As the blotting belt 150 is advanced it is rotated around two large rollers 152, one at either side of the belt conveyor 110, that extends slightly beyond the end of the width of a baking tray 300 (e.g., approximately 26"). The blotting belt 150 is made from a pliable substance that has a thin coating of a waxy substance to make sure that the dough and the belt 150 do not stick to each other and that no particles of cracker dough adhere to the belt 150. The belt 150 remains centered upon two rollers 152 that advance its placement.

The preparation of the surface of the blotting belt 150 allows the dough to touch the belt surface without any dough being transferred to the blotting surface of the belt 150. After, for example, one second of pressing pressure, the tray stops 140 are retracted, and the tray 300 is lowered until it makes contact with the belt conveyor 110 below it and the tray 300 continues on its transport along the roller conveyor 200 to the baking oven.

Figure 19:
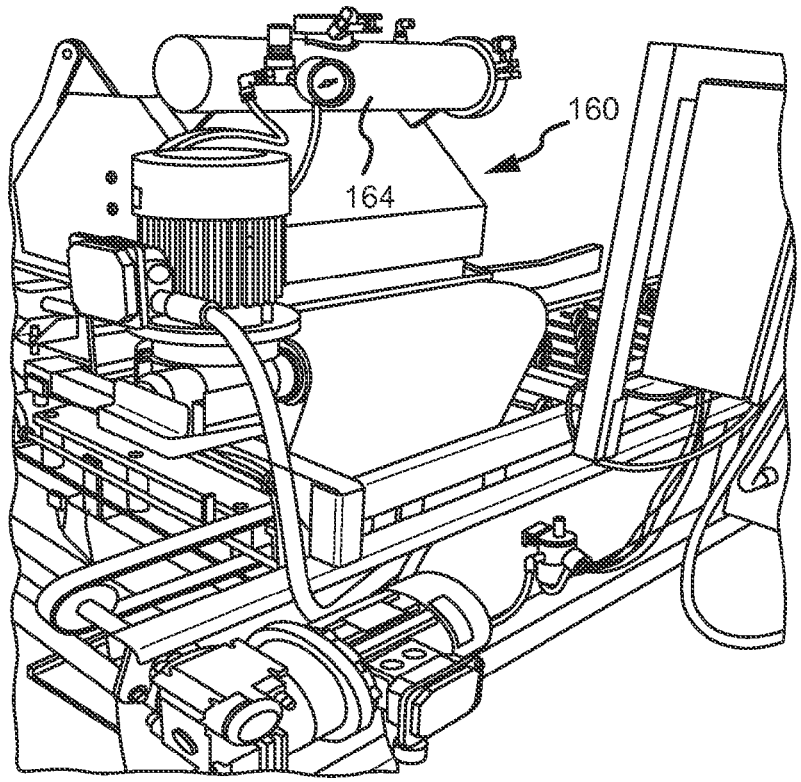
FIG. 19 shows the misting station on the opposite side from FIG. 17 showing the oil reservoir and pressure tank.
Figure 20:
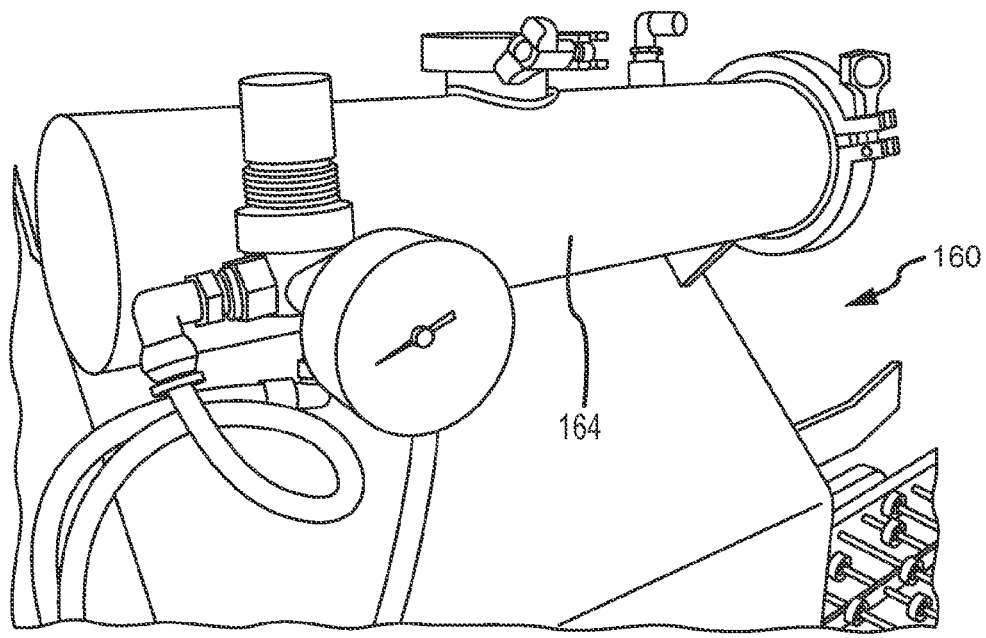
FIG. 20 shows a close up view the cooking oil reservoir and pressure tank of the misting station of the finishing machine of FIG. 3A.
Figure 21:
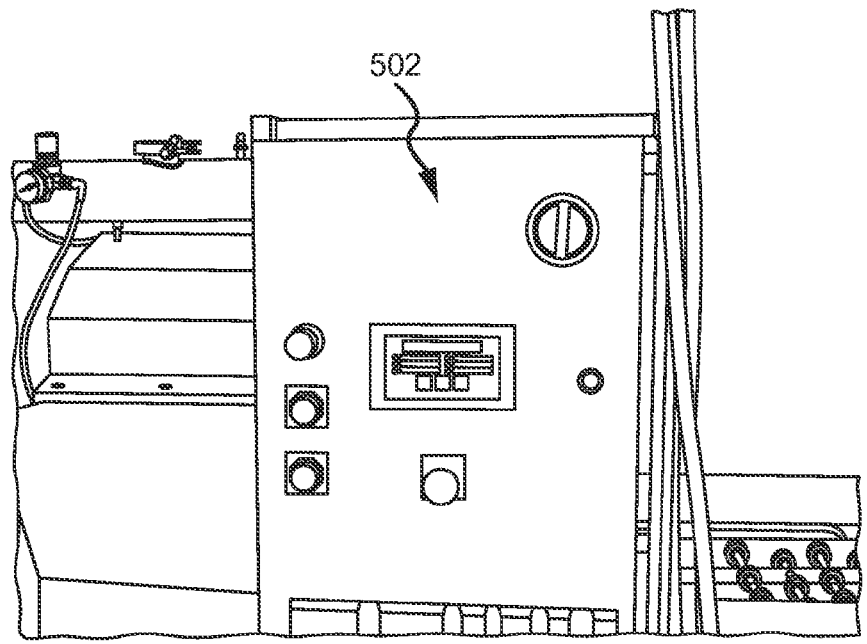
FIG. 21 shows the master control panel of the finishing machine of FIG. 3A.
Figure 22:
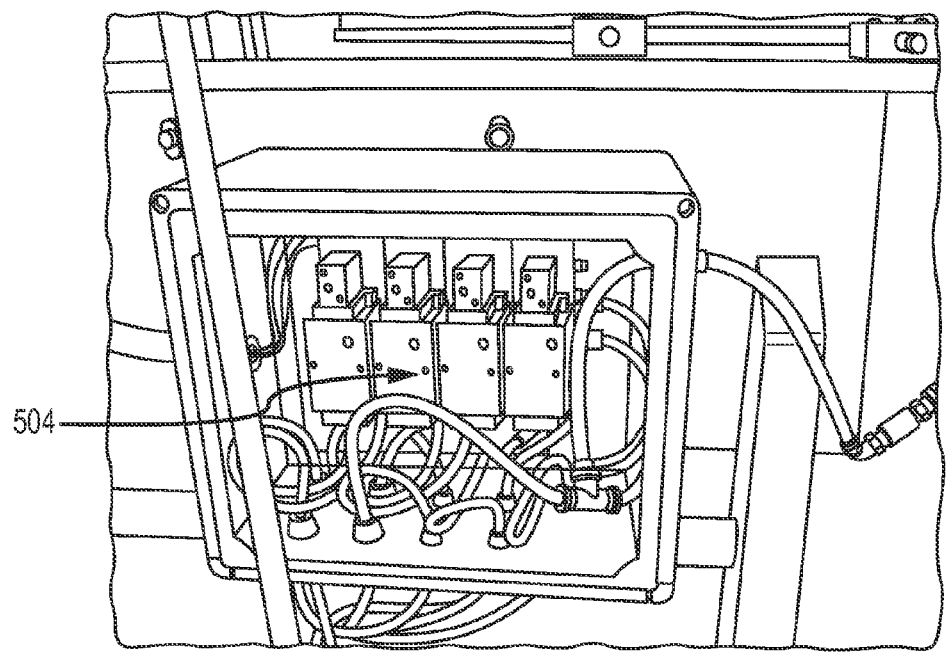
FIG. 22 shows a pneumatic junction box of the finishing machine of FIG. 3A.

Once the blotting belt 150 begins to advance to service the next baking tray 300, the sprayers 162 located inside the misting station 160 begin to emit a fine mist of cooking oil for 2-3 seconds. Each sprayer 162 has a volume control on its top which allows the quantity of oil to be fine tuned. FIG. 19 shows a view of the opposite side of the misting station 160 where the oil reservoir and pressure tank 164 are located. FIG. 20 shows a close up view of the cooking oil reservoir and pressure tank 164 at the misting station 160.

Once the cracker dough has been pressed against the belt 150 and its stationary backing, the tray 300 is lowered back onto the belt conveyor 110 and it proceeds to the baking oven. Thus the controller orchestrates the pneumatic cylinders 122 in coordination with the rotating belt 150 to shape gluten-free or vegan dough products for baking.

6. Controls

The machine is operated by a set of controls 502 that orchestrate the cracker finishing machine. The controls 502 may include control logic (e.g., logic embodied in software or hardware such as a microprocessor in operative communication with a memory). For example, the control logic may be proprietary software that coordinates the pneumatic valves, compressors, and all air controls. In one embodiment, the processor may be a programmable logic controller (PLC) that is operative to execute a PLC program (e.g., a Direct LOGIC 05 PLC processor manufactured by Koyo® Electronics Industries Co., Ltd.). The PLC executing the PLC program may receive and interpret inputs received from sensors or other data sources. Additionally, the PLC may be operative to store or communicate data or to control actuators or other devices by way of output signals. The PLC program may be modifiable to vary the operation of the machine 100 (e.g., by altering the length of processes, etc.). Additionally, the PLC may be in communication with other devices or systems (e.g., other devices in the manufacturing process such as the dough depositor or oven, or a manufacturing control system that coordinates the activities of a plurality of machines).

The activity and coordination of the machine is effected through a digital control panel, system software, and a system of sensors (e.g. electric eyes 156 and sensors 144 as discussed above), pneumatic cylinders, air controls, and electrical switches that act to stop each baking tray at a predetermined spot, lift the tray up and off the belt conveyor 110 and apply pressure against the top of the cracker press, and then return the tray to the belt conveyor 110 with each cracker being ready for baking. The belt 150 then is automatically advanced to its next setting, misted, and the machine waits for the next baking tray 300 to enter its workings.

The controls 502, which may be embodied in a master control panel, include an on/off power switch, an emergency stop button, machine on and machine off switches, an error light, and a processor which may provide read-outs on an LED screen and may be operative to receive inputs to control the speed of the belt conveyor and the pressing time. The LED screen may also include various other data including, for example, a press count corresponding to how many times the pedestal 120 is to cycle for a given baking tray 300, a press time corresponding to how long the baking tray 300 stays pressed against the platen 130, an oil run time corresponding to how long the oil mist sprayers 162 operate mist to the blotting belt 150, a ram travel time corresponding to how long it takes the pedestal 120 to actuate either up or down, and a current press count corresponding to how many times the press has actuated. The controls 502 may also include one or more inputs (e.g., the LED screen may be a touch screen input device) that allows an operator to control the machine (e.g., to advance the conveyor 200, control the pedestal 120, control the blotting belt 150, control the oil mist sprayers 162, control the tray stops 140, etc.).

A pneumatic system 504 receives air from the master air compressor, and distributes it to the cracker press system under the pedestal, the baking tray stops, the pneumatic actuator that keep the blotting belt rollers in adjustment, and the misting station located on the top of the machine. The operation of the pneumatic system 504 may be controlled by way of the PLC.

Figure 23:
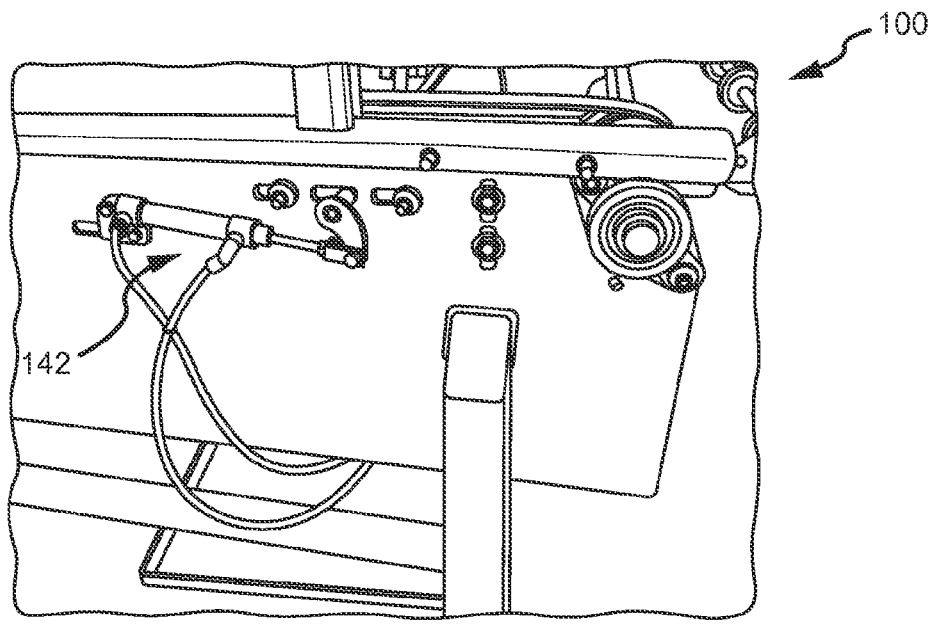
FIG. 23 shows the pneumatic system which turns a lever that lifts and lowers the baking tray stops of the finishing machine of FIG. 3A.

FIG. 23 shows the baking tray stops 140 are controlled by the pneumatic unit 142 which turns a lever that lifts or lowers the stops 140.

Figure 24:
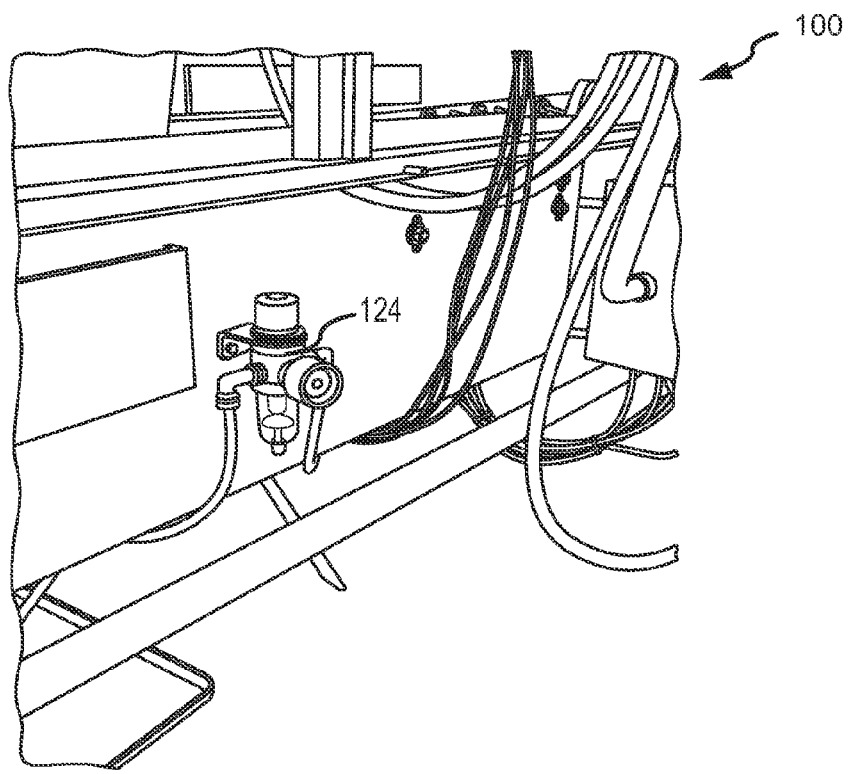
FIG. 24 shows an air control unit for raising or lowering the pneumatic cylinders which may include a water filter to keep water out of the air lines in the finishing machine of FIG. 3A.

FIG. 24 shows an air control unit 124 for the raising and lowering cylinders, which may include a water filter to keep water out of the air lines.

FIG. 25 shows the pneumatic actuator 154 on the back of the machine that adjusts the tilt of the rollers 152 to keep the blotting belt 150 centered.

Once the crackers have been finished, the pedestal 120 lowers the baking tray 300 back into contact with the belt conveyor 110, which then transports the finished tray of crackers out of the front of the cracker finishing machine 100 and back onto the stainless steel roller conveyor for the final leg to the baking oven. The cracker finishing machine 100 operates in a continuous cycle with each cycle devoted to receiving, processing, and ejecting an individual baking pan 300.

In summary, the finishing operations begin when the belt conveyor 110 lifts a loaded baking tray 300 off the roller conveyor 200 and transports it to the pedestal 120. The tray 300 is stopped at the center of the pedestal 120 and situated for pressing. The blotting belt 150 is sprayed with cooking oil and is advanced into position between the baking tray 300 and the steel platen 130. The pedestal 120 lifts the baking tray 300 into contact with the blotting belt 150 and the steel platen 130 and presses the product properly to produce the desired imprint. The pedestal 120 lowers the baking tray 300 until it contacts the belt conveyor 110, at which time the tray stops 140 move aside and the belt conveyor 100 carries the baking tray 300 out of the machine 100 and ejects it onto a waiting roller conveyor, where it is carried, ready for baking, to the baking ovens.

The cracker finishing machine of the present invention produces crackers of excellent quality and consistency while working with gluten-free, vegan dough. Moreover, the machine allows for full automation of a production line and greatly enhances production in relation to a manual practice wherein the finishing functions constituted the bottleneck or limiting factor of production line throughput. In this regard, it has been observed the manual process took about 3 seconds per cracker or 4 minutes to process an 80 cracker tray. Accordingly, a single worker could process about 120 trays per 8 hour shift. Three shifts per 24 hour worker day thus yielded 360 trays or 28,800 crackers per worker day.

In comparison, a single cracker finishing machine processes 1 tray of 80 crackers every 3 seconds. This allows for processing of 28,800 trays or 2,304,000 crackers per day for each machine. It is planned to run 8 machines continuously, which can, in the absence of any delays, allow production of as much as 6,727,680,000 crackers per year in a single facility.

Although the description above refers to a single dough depositor machine, a single finishing machine, and a single oven for baking, the invention should not be understood as requiring a linear configuration. Indeed, it is expected that, in the most efficient configurations, the machines will be arranged to have generally matching capacities. For example, three dough depositor machines may feed a single finishing machine which in turn may feed 12 ovens. Moreover, other machines may be provided in the production line, or other functionality may be built into the finishing or another one of the machines. For example, the dough may be processed to provide branding or other impressions, to provide perforations to assist in cracking the crackers, or to cut the dough to a desired shape/separate the crackers. Similarly, the tray may be shaped, rather than flat, to provide desired dough shaping or texturing.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A finishing machine for use in manufacturing a baked product using a non-traditional dough, said non-traditional dough being at least one of gluten-free, wheat-free, dairy free, egg-free, vegetarian, or vegan dough, comprising:
    an intake for receiving a baking tray having a plurality of portions of non-traditional dough deposited thereon;
    a press comprising a movable pedestal and an immovable platen, wherein the movable pedestal is displaceable with respect to the immovable platen by a pressing station through lifting the baking tray by the pressing station to compress the portions of non-traditional dough to shape the portions of non-traditional dough into a predetermined product shape;
    a moisturizing system for applying a predetermined amount of cooking oil to the portions of non-traditional dough, wherein the moisturizing system includes a blotting belt having cooking oil applied thereto by an oil supplying station and positioned between the immovable platen and the baking tray, wherein the blotting belt wraps around a top and a bottom of the immovable platen in a form of a continuous loop to form a blotting surface between the immovable platen and the deposited non-traditional dough portions and advances at fixed intervals such that the portions of non-traditional dough contact the blotting surface of the blotting belt when compressed against the immovable platen to reduce adhesion between the portions of non-traditional dough and the immovable platen and apply the cooking oil to the portions of non-traditional dough;
    a belt conveyor system configure to transport the baking tray to the press and to carry the baking tray away from the finishing machine when the cracker is finished; and
    a discharge for expelling the baking tray having the portions of non-traditional dough in the predetermined product shape thereon.

2. A finishing machine according to claim 1, wherein the cooking oil is applied to the blotting belt by spraying the cooking oil onto the blotting belt.

3. A finishing machine according to claim 2, wherein the cooking oil is sprayed at not less than 5.5 psi and not greater than 7 psi.

4. A finishing machine according to claim 1, wherein the blotting belt is advanced to expose a portion of the blotting belt on which the cooking oil has been applied after each operating cycle of the press.

5. A finishing machine according to claim 4, wherein the cooking oil is only applied as the blotting belt is advanced.

6. A finishing machine according to claim 4, wherein the cooking oil is sprayed for a duration of at least about 2 seconds and not more than about 3 seconds.

7. A finishing machine according to claim 4, wherein the blotting belt is advanced to expose a portion of the blotting belt on which the cooking oil has been applied at each operating, cycle of the press.

8. A finishing machine according to claim 7, wherein at least one roller about which the blotting belt is disposed is controllably adjustable to maintain the position of the blotting belt with respect to the platen and the baking tray.

9. A finishing machine according to claim 1, further comprising a controller for controlling the operation of the press.

10. A finishing machine according to claim 9, wherein the controller is operable to control at least one of a compression force applied when compressing the portions of non-traditional dough or a duration of the compression.

\* \* \* \* \*

UNITED STATES PATENT AND TRADEMARK OFFICE
CERTIFICATE OF CORRECTION

| | |
|---|---|
| PATENT NO. | : 9,192,168 B1 |
| APPLICATION NO. | : 13/706238 |
| DATED | : November 24, 2015 |
| INVENTOR(S) | : Dale Rodrigues |

It is certified that error appears in the above-identified patent and that said Letters Patent is hereby corrected as shown below:

Claims

Column 14, line 21, delete "configure" and insert therefore --configured--

Signed and Sealed this
Tenth Day of May, 2016

Michelle K. Lee
*Director of the United States Patent and Trademark Office*